United States Patent
Qiu et al.

(10) Patent No.: US 10,618,445 B2
(45) Date of Patent: Apr. 14, 2020

(54) COOLING ASSEMBLY FOR VEHICLE INTERIOR

(71) Applicant: TOYOTA JIDOSHA KABUSHIKI KAISHA, Toyota-shi, Aichi-ken (JP)

(72) Inventors: Zekai Qiu, Nisshin (JP); Hironobu Kitaoka, Nisshin (JP); Naoki Yamamuro, Nagoya (JP); Kozo Kosho, Toyota (JP); Hiroaki Sugiyama, Nagoya (JP); Makoto Ikegami, Obu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/175,935

(22) Filed: Oct. 31, 2018

(65) Prior Publication Data
US 2019/0126803 A1    May 2, 2019

(30) Foreign Application Priority Data

Nov. 1, 2017   (JP) .................. 2017-211876

(51) Int. Cl.
| | |
|---|---|
| *B60N 3/10* | (2006.01) |
| *B60R 16/033* | (2006.01) |
| *B60L 1/00* | (2006.01) |
| *B60L 58/10* | (2019.01) |
| *H02J 7/00* | (2006.01) |
| *B60L 1/02* | (2006.01) |

(52) U.S. Cl.
CPC ............ *B60N 3/104* (2013.01); *B60L 1/00* (2013.01); *B60L 1/006* (2013.01); *B60L 1/02* (2013.01); *B60L 58/10* (2019.02); *B60R 16/033* (2013.01); *H02J 7/00* (2013.01)

(58) Field of Classification Search
CPC ........ B60K 7/0007; B60G 7/01; B60N 3/104; B60L 1/00; B60L 1/02
See application file for complete search history.

(56) References Cited

U.S. PATENT DOCUMENTS

| | | | |
|---|---|---|---|
| 6,490,995 B2 * | 12/2002 | Greene, Jr. .......... | A01K 1/0236 119/482 |
| 2013/0001972 A1 * | 1/2013 | Ugalde ................... | B60R 5/04 296/24.43 |

FOREIGN PATENT DOCUMENTS

WO   2012/141214 A1   10/2012

* cited by examiner

*Primary Examiner* — John D Walters
*Assistant Examiner* — James J Triggs
(74) *Attorney, Agent, or Firm* — Hunton Andrews Kurth LLP

(57) ABSTRACT

A vehicle includes: a main body; a rotary electric machine provided in the main body; a driving battery configured to be chargeable and dischargeable and supply power to the rotary electric machine; a cooling box detachable from the main body; at least one detachable battery detachable from the main body; and a charger configured to charge the detachable battery with power supplied from the driving battery, the detachable battery being configured to be attachable to the cooling box.

4 Claims, 6 Drawing Sheets

COOLING ASSEMBLY FOR VEHICLE INTERIOR

This nonprovisional application is based on Japanese Patent Application No. 2017-211876 filed on Nov. 1, 2017, with the Japan Patent Office, the entire contents of which are hereby incorporated by reference.

BACKGROUND

Field

The present disclosure relates to a vehicle, and more particularly, to a vehicle comprising a cooling box.

Description of the Background Art

International Publication No. 2012/141214 describes a vehicle in which devices such as a car stereo, a camera, an air conditioner and the like are detachably configured and each device is provided with a battery integrally.

SUMMARY

However, in the above vehicle, each device is provided with a battery, and when the device is taken outside the vehicle, and the amount of power stored in the battery is reduced, it is necessary to again charge the battery in the vehicle.

In that case, it is necessary to carry the battery together with the device provided therewith, which will be significantly cumbersome for a user who takes the device out of the vehicle and thus uses it.

The present disclosure has been made in view of the above issue, and an object thereof is to provide a vehicle allowing a cooling box to be taken out of the vehicle, which enhances convenience in using the cooling box outside the vehicle.

According to the present disclosure, a vehicle comprises: a main body; a rotary electric machine provided in the main body; a driving battery configured to be chargeable and dischargeable and supply power to the rotary electric machine; a cooling box detachable from the main body; at least one detachable battery detachable from the main body; and a charger configured to charge the detachable battery with power supplied from the driving battery. The detachable battery is configured to be attachable to the cooling box.

The main body has formed therein a passenger compartment configured to accommodate a passenger therein and an accommodation compartment adjacent to the passenger compartment in a front-rear direction. The main body includes a floor panel forming a bottom surface of the main body and a partition panel partitioning the accommodation compartment. The charger is provided between the floor panel and the partition panel. The cooling box is provided on an upper surface of the partition panel. The detachable battery is configured to be attachable to a device used outside the vehicle. The charger is configured to charge a plurality of such detachable batteries.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

A vehicle according to an embodiment will be described with reference to FIGS. 1 to 9. Of the configurations shown in FIG. 1 to FIG. 9, any configuration that is identical or substantially identical is identically denoted and will not be described redundantly.

Figure 1:
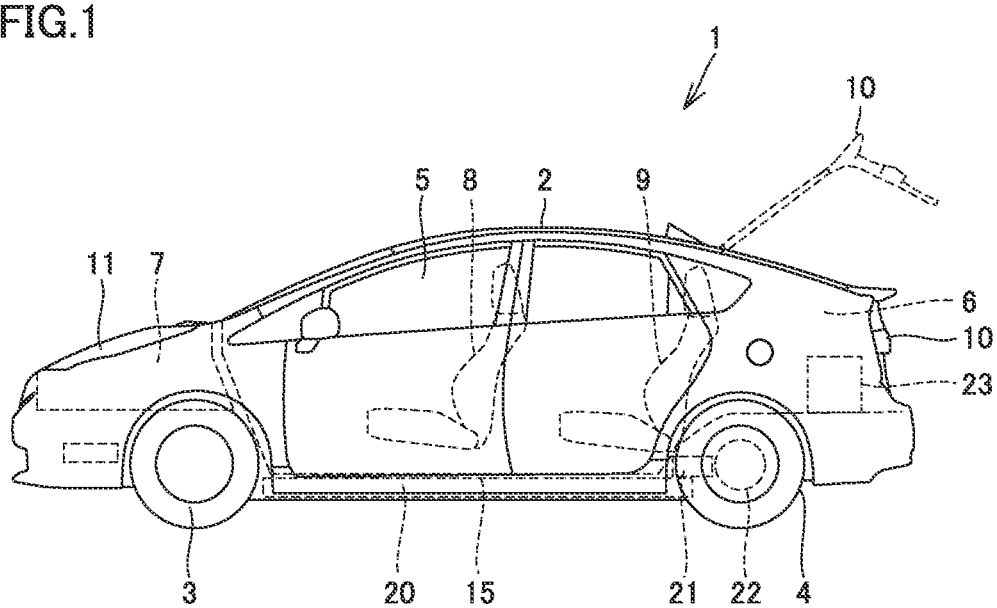
FIG. 1 is a side view of a vehicle according to an embodiment.

FIG. 1 is a side view of a vehicle 1 according to the present embodiment. Vehicle 1 comprises a main body 2, a front wheel 3, and a rear wheel 4.

Main body 2 has a passenger compartment 5 and accommodation compartments 6, 7 formed therein. Passenger compartment 5 is a space in which a passenger is accommodated. Accommodation compartment 7 is formed in main body 2 frontwardly of passenger compartment 5. Accommodation compartment 6 is formed in main body 2 rearwardly of passenger compartment 5.

Vehicle 1 includes a front seat 8 and a rear seat 9, and front seat 8 and rear seat 9 are accommodated in passenger compartment 5. Front seat 8 is provided in main body 2 frontwardly of rear seat 9. Rear seat 9 is provided so as to define passenger compartment 5 and accommodation compartment 6 within vehicle 1.

Main body 2 includes a rear hatch 10 and a front hatch 11, and front hatch 11 is provided to main body 2 so as to open and close accommodation compartment 7.

Figure 2:
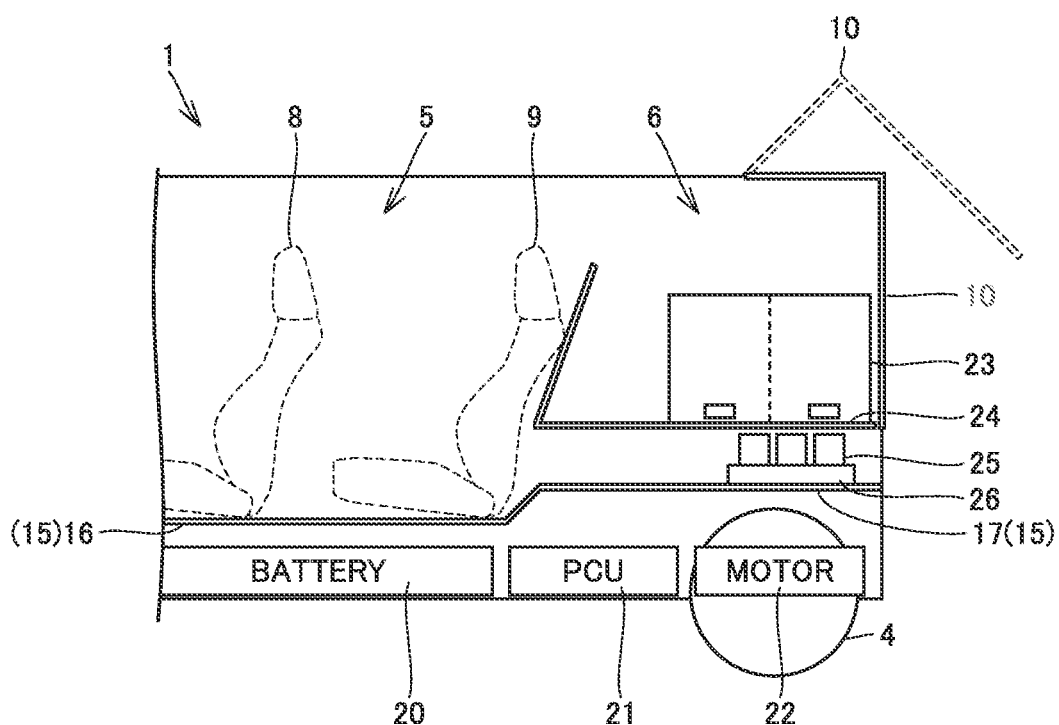
FIG. 2 is a diagram schematically showing a rear side of the vehicle.

FIG. 2 is a diagram schematically showing a rear side of vehicle 1. Rear hatch 10 is provided to main body 2 so as to be capable of opening and closing accommodation compartment 6.

Main body 2 includes a floor panel 15. Floor panel 15 is a metallic plate-shaped member and forms a bottom surface of main body 2. Floor panel 15 includes a center panel 16 and a rear panel 17. Center panel 16 forms a bottom surface of passenger compartment 5, and rear panel 17 forms a bottom surface of accommodation compartment 6.

Vehicle 1 comprises a driving battery 20, a PCU (Power Control Unit) 21, a rotary electric machine 22, a cooling box 23, a partition panel 24, a detachable battery 25, and a charger 26.

Driving battery 20, PCU 21, and rotary electric machine 22 are provided on a side under a lower surface of floor panel 15.

Partition panel 24 defines an interior of accommodation compartment 6, and cooling box 23 is provided on an upper surface of partition panel 24. Detachable battery 25 and charger 26 are provided on a side under a lower surface of partition panel 24. Charger 26 is provided on an upper surface of rear panel 17, and a plurality of detachable batteries 25 are connected to charger 26.

Figure 3:
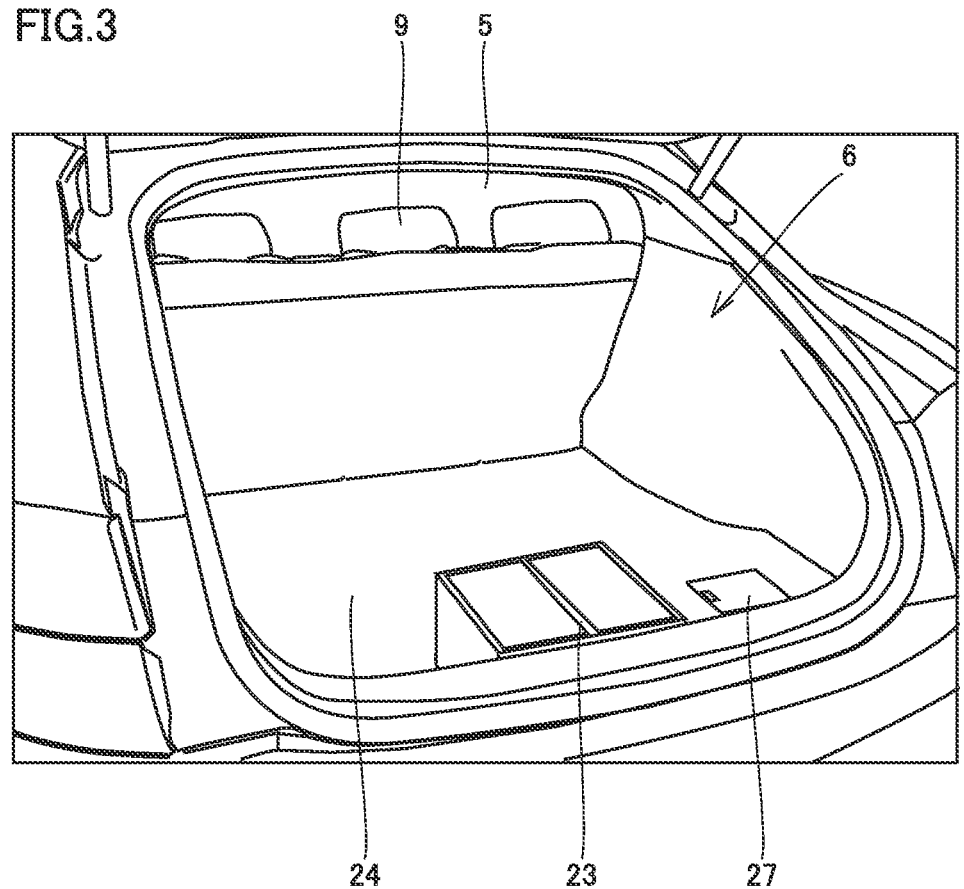
FIG. 3 is a perspective view with a rear hatch opened.

FIG. 3 is a perspective view with rear hatch 10 opened. Partition panel 24 is provided with a lid 27. Lid 27 is provided at a position adjacent to a location of cooling box 23.

Figure 4:
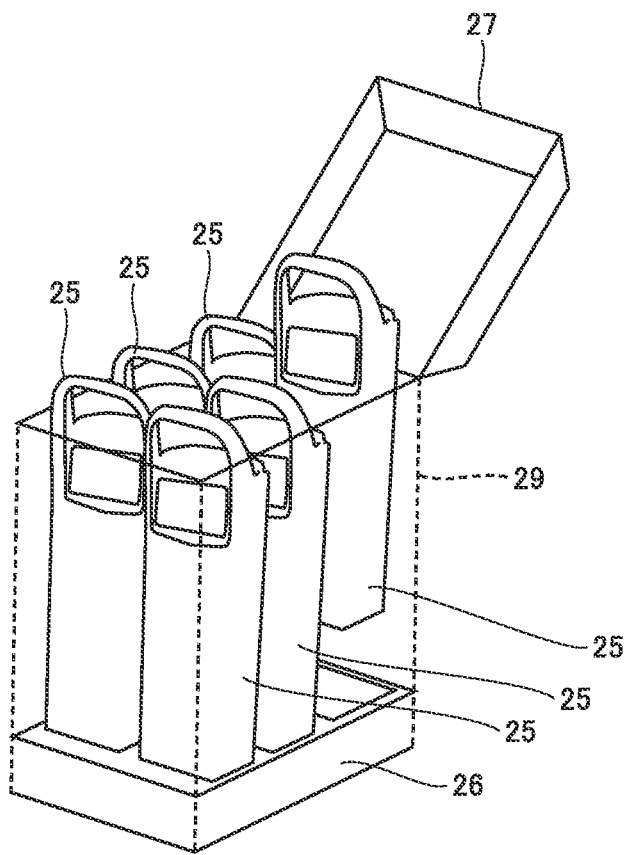
FIG. 4 is a diagram schematically showing a lid and its surrounding configuration.

FIG. 4 is a diagram schematically showing lid 27 and its surrounding configuration. Lid 27 is provided to an accommodation case 29, and charger 26 and a plurality of detachable batteries 25 are accommodated in accommodation case 29. In this manner, the plurality of detachable batteries 25 and the like are disposed under the lower surface of partition panel 24.

This can prevent charger 26 from occupying a space for accommodating baggage and the like, and ensures a large space for accommodating baggage.

Figure 5:
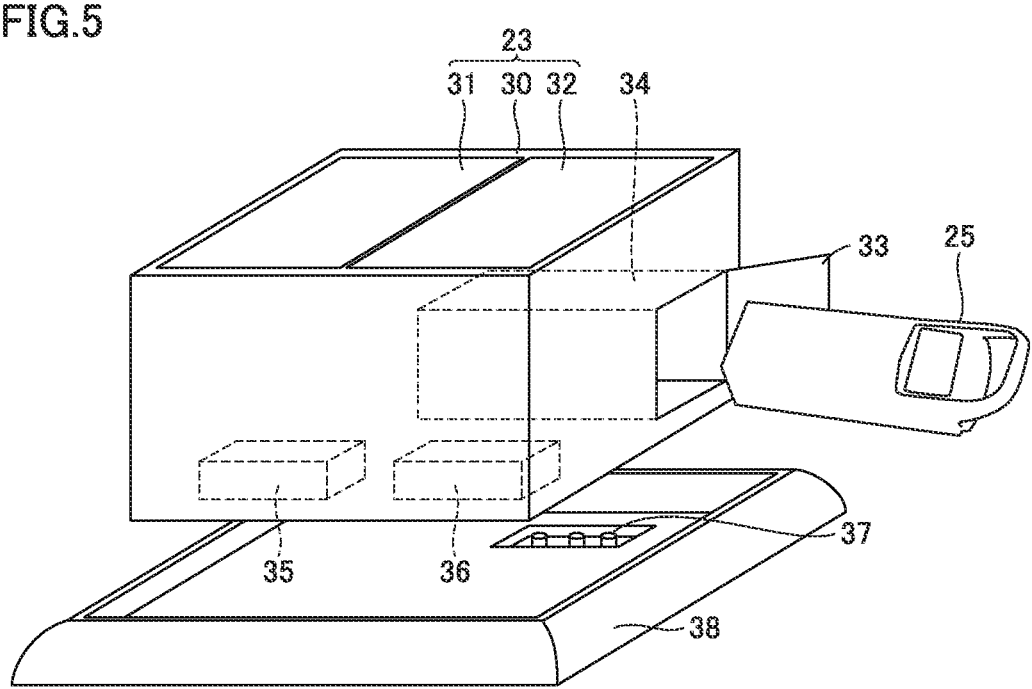
FIG. 5 is a schematic perspective view of a cooling box.

FIG. 5 is a schematic perspective view of cooling box 23. Cooling box 23 includes a main body 30, doors 31, 32, 33, and Peltier elements 35, 36. In main body 30, a freezing compartment and a refrigerating compartment, and a battery accommodation compartment 34 are formed. Note that the cooling box has at least one of a refrigerating function and a freezing function.

Door 31 is provided to main body 30 so as to be capable of opening and closing the freezing compartment, and Peltier element 35 is provided in the freezing compartment. Peltier element 35 is driven to cool air inside the freezing compartment.

Door 32 is provided to main body 30 so as to be capable of opening and closing the refrigerating compartment. In the refrigerating compartment Peltier element 36 is provided. Peltier element 36 is driven to cool air inside the refrigerating compartment.

Cooling box 23 is supported by a circular-shaped base 38 formed on an upper surface of partition panel 24. Inside base 38, a connection terminal 37 is provided. Cooling box 23 has a bottom surface provided with a connecting portion (not shown), and when cooling box is attached to base 38, the connection portion of cooling box 23 is connected to connection terminal 37. Peltier elements 35 and 36 are thus supplied with power and thus driven. Note that cooling box 23 can be installed in a variety of types of structures.

Door 33 is provided to main body 30 so as to be capable of opening and closing battery accommodation compartment 34. Battery accommodation compartment 34 is formed so as to accommodate detachable battery 25. A terminal connected to detachable battery 25 is provided in battery accommodation compartment 34, and power is supplied from detachable battery 25 to Peltier elements 35, 36 through this terminal.

Figure 6:
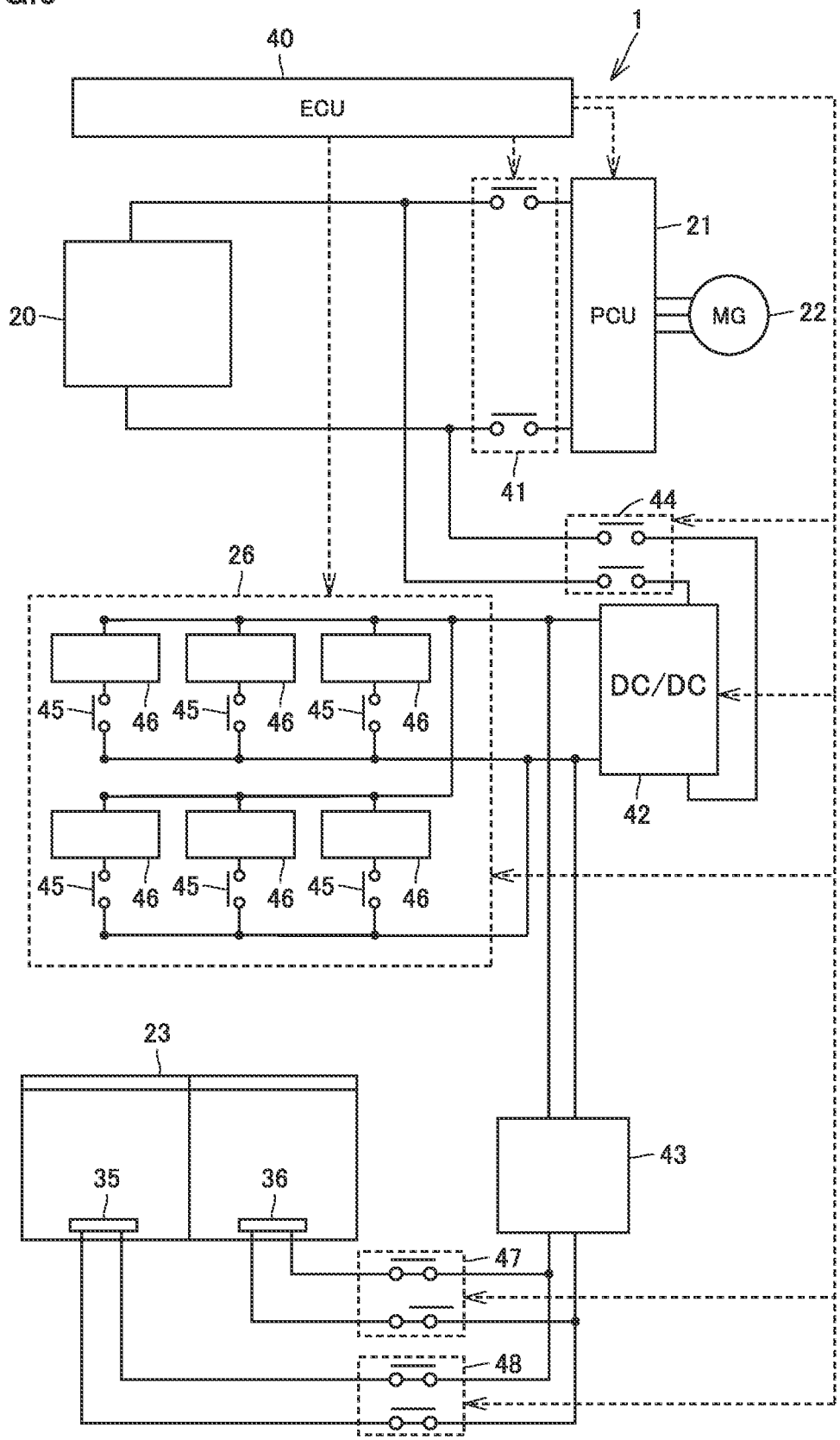
FIG. 6 is a block diagram schematically showing a configuration of the vehicle.

FIG. 6 is a block diagram schematically showing a configuration of vehicle 1. Vehicle 1 comprises an ECU (Electronic Control Unit) 40, an SMR (system main relay) 41, a DC/DC converter 42, an auxiliary battery 43, and relays 44, 47, 48.

Driving battery 20 is connected to PCU 21 via SMR 41. PCU 21 is connected to rotary electric machine 22. Rotary electric machine 22 is connected to rear wheel 4 shown in FIG. 1. SMR 41 is configured to connect PCU 21 and driving battery 20 and disconnect PCU 21 and driving battery 20.

PCU 21 receives DC power from driving battery 20, converts the DC power into AC power, and supplies the AC power to rotary electric machine 22. Rotary electric machine 22 receives the AC power and thereby generates a driving force to rotate rear wheel 4. Note that PCU 21 is driven based on a command issued from ECU 40.

DC/DC converter 42 is connected to driving battery 20 via relay 44. Charger 26 and auxiliary battery 43 are connected to DC/DC converter 42.

Charger 26 includes a plurality of relays 45 and a plurality of charging terminals 46. Charging terminal 46 is for supplying power to detachable battery 25.

When detachable battery 25 is connected to charging terminal 46, relays 44, 45 are closed, and via DC/DC converter 42 DC power is supplied to detachable battery 25 through charging terminal 46. Once charging of detachable battery 25 has been completed, relay 45 is opened.

The plurality of charging terminals 46 are each provided with relay 45, and each relay 45 and each charging terminal 46 are connected to DC/DC converter 42 in parallel. Therefore, even when a plurality of detachable batteries 25 are attached, detachable batteries 25 can be individually charged.

Peltier elements 35, 36 are connected to auxiliary battery 43 via relays 47, 48. When cooling the air in cooling box 23, ECU 40 closes relays 47, 48. ECU 40 drives DC/DC converter 42 to supply power to Peltier element 35 and Peltier element 36. Thus the air in the refrigerating compartment and the air in the freezing compartment are cooled by Peltier element 35 and Peltier element 36.

Vehicle 1 configured as described above allows a user to carry cooling box 23 to outside the vehicle. Specifically, in FIG. 5, by lifting cooling box 23 upward, cooling box 23 can be removed from base 38.

Then, lid 27 shown in FIG. 4 is opened, and detachable battery 25 is taken out. Detachable battery 25 is attached in battery accommodation compartment 34. Once detachable battery 25 has been attached, Peltier elements 35 and 36 are supplied with power and thus driven thereby.

Figure 7:
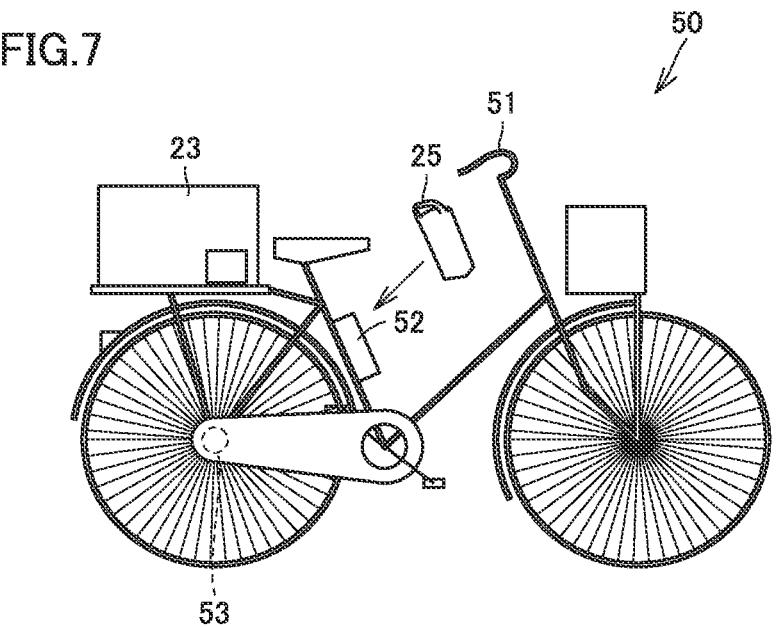
FIG. 7 is a schematic diagram showing a state in which the cooling box is taken outside.

FIG. 7 is a schematic diagram showing a state in which cooling box 23 is taken outside.

A bicycle 50 is an electrically assisted bicycle. Bicycle 50 includes a main body 51, a terminal mount 52, and a motor 53. Terminal mount 52 allows detachable battery 25 to be attached thereto.

Terminal mount 52 selectively supplies electric power from the attached detachable battery 25 to motor 53. When the user pedals bicycle 50, motor 53 assists the user to do so.

In this manner, bicycle 50 allows detachable battery 25 to be attached thereto and can also be used outside vehicle 1. In the example shown in FIG. 7, cooling box 23 is placed on a rack of bicycle 50.

Figure 8:
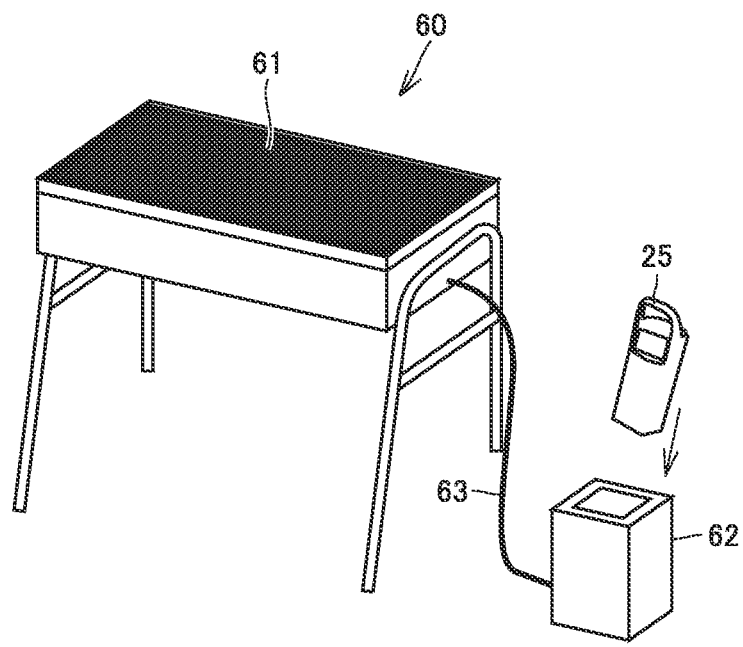
FIG. 8 is a perspective view schematically showing an electric stove.

FIG. 8 is a perspective view schematically showing an electric stove 60. Electric stove 60 includes a main body 61, a power supply unit 62, and an electric cord 63.

Power supply unit 62 allows detachable battery 25 to be attached thereto. When detachable battery 25 is attached to power supply unit 62, the power of detachable battery 25 is supplied to main body 61 through electric cord 63. Main body 61 is provided with a heating unit therein, and heated to high temperature by the power supplied from detachable battery 25. Foodstuff disposed on a top surface of main body 61 can thus be cooked.

While cooling box 23, bicycle 50, and electric stove 60 are used, detachable battery 25 may have small power stored therein or may run out of power.

In that case, the user can take another charged detachable battery 25 out of vehicle 1 and attach it to cooling box 23, bicycle 50, electric stove 60, and the like to continue to use them.

The user can attach detachable battery 25 having a reduced amount of power stored therein to charger 26 to thus charge detachable battery 25.

Thus, according to vehicle 1 of the present embodiment, by replacing detachable battery 25 with another, cooling box 23 can be continuously used outside vehicle 1. Bicycle 50 and electric stove 60 used outside vehicle 1 can also be similarly used continuously.

In particular, in vehicle 1, a plurality of detachable batteries 25 can be charged, and detachable batteries 25 can be attached to a plurality of devices.

Figure 9:
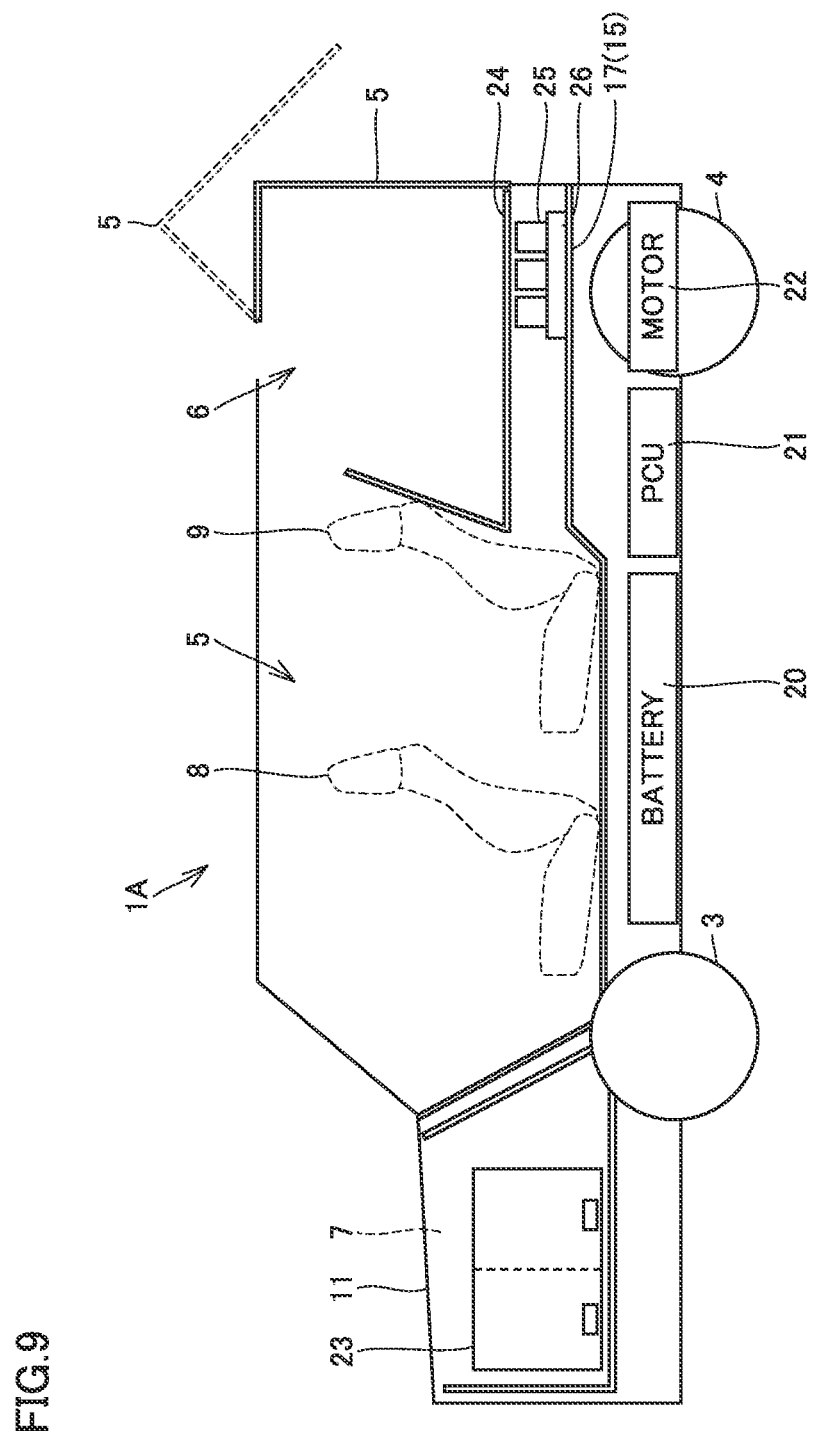
FIG. 9 is a schematic diagram showing a modified example of the vehicle.

FIG. 9 is a schematic diagram showing a vehicle 1A which is a modified example of vehicle 1. In vehicle 1A, cooling box 23 is accommodated in accommodation compartment 7, and detachable battery 25 and charger 26 are disposed under partition panel 24. In this way, cooling box 23, and partition panel 24 and detachable battery 25 may be separated.

That is, cooling box 23, and partition panel 24 and detachable battery 25 are disposed in at least one of accommodation compartment 7 and accommodation compartment 6.

While an embodiment of the present disclosure has been described, it should be understood that the embodiment disclosed herein has been described for the purpose of illustration only and in a non-restrictive manner in any respect. The scope of the present disclosure is defined by the terms of the claims, and is intended to include any modifications within the meaning and scope equivalent to the terms of the claims.

What is claimed is:

1. A vehicle comprising:
a main body;
a rotary electric machine provided in the main body;
a driving battery configured to be chargeable and dischargeable and supply power to the rotary electric machine;
a cooling box detachable from the main body;
at least one detachable battery detachable from the main body; and
a charger configured to charge the detachable battery with power supplied from the driving battery,
the detachable battery being configured to be attachable to the cooling box.

2. The vehicle according to claim 1, wherein
the main body has formed therein a passenger compartment configured to accommodate a passenger therein and an accommodation compartment adjacent to the passenger compartment in a front-rear direction,
the main body includes a floor panel forming a bottom surface of the main body and a partition panel partitioning the accommodation compartment,
the charger is provided between the floor panel and the partition panel, and
the cooling box is provided on an upper surface of the partition panel.

3. The vehicle according to claim 1, wherein the detachable battery is configured to be attachable to a device used outside the vehicle.

4. The vehicle according to claim 1, wherein the charger is configured to charge a plurality of detachable batteries.

* * * * *